(12) United States Patent
Gray et al.

(10) Patent No.: US 7,584,882 B2
(45) Date of Patent: Sep. 8, 2009

(54) SYSTEM AND METHOD FOR MANAGING FINANCIAL DATA

(75) Inventors: Jeffrey Scott Gray, Florence, KY (US); James Todd Shofner, Florence, KY (US)

(73) Assignee: The Kroger Co., Cincinnati, OH (US)

( * ) Notice: Subject to any disclaimer, the term of this patent is extended or adjusted under 35 U.S.C. 154(b) by 376 days.

(21) Appl. No.: 11/047,451

(22) Filed: Jan. 31, 2005

(65) Prior Publication Data

US 2006/0169774 A1 Aug. 3, 2006

(51) Int. Cl.
*G06F 17/00* (2006.01)
(52) U.S. Cl. ..................... 235/375; 235/385
(58) Field of Classification Search ........... 235/385, 235/376, 375, 378
See application file for complete search history.

(56) References Cited

U.S. PATENT DOCUMENTS

| | | | | |
|---|---|---|---|---|
| 4,128,757 A * | 12/1978 | Garner, Jr. | .................. | 235/383 |
| 4,521,677 A * | 6/1985 | Sarwin | .................. | 235/385 |
| 4,563,739 A * | 1/1986 | Gerpheide et al. | ............ | 705/28 |
| 4,680,703 A * | 7/1987 | Kriz | .................. | 711/112 |
| 5,237,498 A * | 8/1993 | Tenma et al. | .................. | 705/30 |
| 5,573,082 A * | 11/1996 | Conlan et al. | .................. | 186/44 |
| 5,596,493 A * | 1/1997 | Tone et al. | .................. | 705/10 |
| 5,986,219 A * | 11/1999 | Carroll et al. | .................. | 177/1 |
| 6,015,167 A * | 1/2000 | Savino et al. | .................. | 283/67 |
| 6,102,162 A * | 8/2000 | Teicher | .................. | 186/39 |
| 6,616,037 B2 * | 9/2003 | Grimm et al. | .................. | 235/385 |
| 6,930,296 B2 * | 8/2005 | Chen | .................. | 219/700 |
| 7,184,990 B2 * | 2/2007 | Walker et al. | .................. | 705/400 |
| 2001/0047293 A1 * | 11/2001 | Waller et al. | .................. | 705/10 |
| 2001/0056376 A1 * | 12/2001 | Walker et al. | .................. | 705/15 |
| 2003/0093313 A1 | 5/2003 | Kiefer | | |
| 2004/0107141 A1 * | 6/2004 | Conkel et al. | .................. | 705/15 |
| 2004/0153381 A1 | 8/2004 | Smith | | |
| 2005/0051528 A1 * | 3/2005 | Chen | .................. | 219/388 |
| 2005/0256726 A1 * | 11/2005 | Benson et al. | .................. | 705/1 |

FOREIGN PATENT DOCUMENTS

| | | |
|---|---|---|
| JP | 11144152 | 5/1999 |
| JP | 2001350827 | 12/2001 |

(Continued)

OTHER PUBLICATIONS

Applicant's description of a Selling Gross Margin System that was in use prior to Jan. 31, 2004, 1 pg.

*Primary Examiner*—Daniel A Hess
*Assistant Examiner*—Paultep Savusdiphol
(74) *Attorney, Agent, or Firm*—Thompson Hine LLP

(57) ABSTRACT

A system and method for managing financial data for a store that enables management to track and monitor the actual cost of items sold in each store of an enterprise. The system tracks the number, type and cost of each case received at a store within an enterprise and calculates a cost for each item capable of being produced using the components of the cases. The system receives information regarding items sold by the store and retrieves a cost for the items sold. The system may use the cost and retail sales information to generate financial data. The system may also be used to determine the costs associated with the store inventory.

25 Claims, 4 Drawing Sheets

FOREIGN PATENT DOCUMENTS

| | | |
|---|---|---|
| JP | 2002083108 | 3/2002 |
| JP | 2002236792 | 8/2002 |
| JP | 2002259524 | 9/2002 |
| JP | 2003036293 | 2/2003 |
| JP | 2003168170 | 6/2003 |
| JP | 2003242220 | 8/2003 |
| JP | 2004078339 | 3/2004 |
| JP | 2004118710 | 4/2004 |

* cited by examiner

US 7,584,882 B2

SYSTEM AND METHOD FOR MANAGING FINANCIAL DATA

FIELD OF INVENTION

The present application relates to a financial data management system and method, and in particular to a system and method for retail outlets such as a supermarket to manage financial data including calculation and analysis of gross profits.

BACKGROUND OF THE INVENTION

A number of systems and accounting methods have bee3n developed to manage financial data for retail outlets or stores. Determining the optimal selection of retail goods requires monitoring and detailed analysis of cost as well as the ability to process large quantities of data.

Traditional retail accounting methods match the items shipped to a store to the items sold by a store during a given period. However, items shipped to a store during a given time period are not necessarily equal to the items sold by a store during that time. Consequently, traditional retail accounting methods may artificially increase or decrease costs. There is a need for a system that provides for a true accounting of the cost of goods sold by determining gross profit based upon the items actually sold rather than the items delivered to a store.

BRIEF SUMMARY OF THE INVENTION

A method and system are provided for managing financial data for a store. The method includes receiving a case at a store, where a case includes components capable of being used to produce a variable number or type of items. Case code information, case composition information and case cost information for the case are also received. The case code information identifies the nature of components in the case. The case composition information identifies one or more types of items capable of being produced using the components of the case. An item cost is calculated for each of the types of items capable of being produced using the components of the case. The item cost is calculated using the case composition information and the case cost information and stored in a cost database. Next, an item is identified and an item cost is retrieved from the cost database and associated with the item. Financial data is generated using the item cost for the identified item.

BRIEF DESCRIPTION OF THE SEVERAL VIEWS OF THE DRAWING

While the specification concludes with claims particularly pointing out and distinctly claiming the present invention, it is believed that the present invention will be better understood from the following description in conjunction with the accompanying drawing figures, in which like reference numerals identify like elements, and wherein:

DETAILED DESCRIPTION OF THE INVENTION

Figure 1:
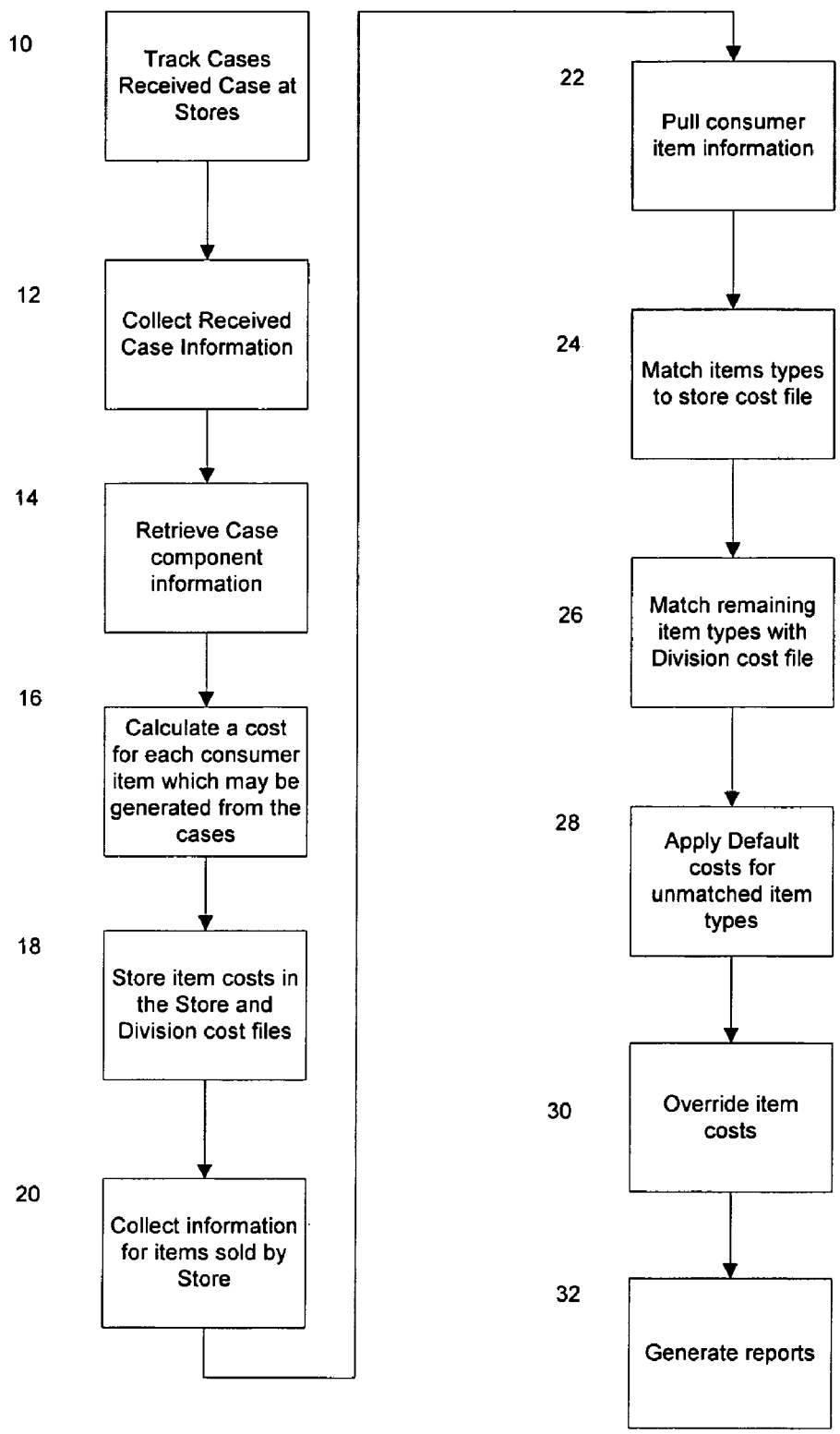
FIG. 1 is a flowchart illustrating a process of generating financial reports.

For the purposes of describing one embodiment of the present invention, this description will discuss a large retail grocery enterprise. This embodiment is merely exemplary in nature and is in no way intended to limit the invention, its application, or uses and alternatively this invention can be used in most any retail, wholesale or service enterprise.

I. System and Method Overview

The system and method developed herein, enables management to track and monitor the actual cost of items sold in each store of an enterprise. An enterprise comprises a number of stores that may be grouped by geographical or corporate characteristics, such as divisions. Divisions may be defined by geographical location, type of store, e.g. a convenience store or a superstore, or demographics, e.g. rural, urban or suburban. In addition, the demographic profiles of store customers may be used to group stores (e.g. a suburban middle class neighborhood or a suburban upper income neighborhood). As used herein, a store can be a retail outlet, wholesale outlet, restaurant, branch office or other physical location where transactions involving goods or services occur between the customer and the enterprise. The store is accountable for meeting budgetary commitments on a regular basis and has profit and loss accountability to the entire enterprise. Stores may be subdivided into smaller sections or departments to more effectively control and track their revenues and expenses. Examples of departments for a typical large retail store or what is generally called a superstore may include a men's clothing department, women's clothing department, toy department, consumer electronics department, grocery department, sporting goods department, automotive department, pharmacy department, furniture department, shoe department, alcoholic beverages department, house wares department, baby department and the like. Examples of departments within a typical grocery store can include the meat department, pharmacy department, grocery department, produce department, frozen foods department and the like. Departments may be sub-divided into commodities to facilitate better control over the activities in the department. For example, the meat department may be subdivided into commodities such as hotdogs, bacon and the like. Commodities may be further divided into subcommodities. For example, beef franks is a subcommodity within the hotdog commodity. Subcommodities are collections of items. An item, as used herein, is a unit of sale of a good. Items may be delivered to store from warehouses or directly from vendors in cases. A case, as used herein, is a collection of items packaged for delivery to a store. For example, a case may be a side of beef, a crate of oranges, a tray of cookie dough or a cardboard box filled with items such as canned vegetables, boxes of cereal and the like.

The system provides the methodology and tools to consistently calculate the actual cost for items sold. The system may be used to track gross profit on an item, subcommodity, commodity, department, store, division and enterprise basis. Gross profits are calculated by matching items sold out of the store, at the retail price paid, with the corresponding items delivered into the store, at the cost charged to the store.

FIG. 1 illustrates a process for generating financial reports for a store within an enterprise. At step 10, the system may collect information regarding the number, type and cost of each case received at a store within an enterprise. The system requires accurate information regarding the shipment of cases to a store including cases received from an enterprise-operated warehouse as well as cases delivered directly from vendors. At step 12, this shipment or delivery data may be periodically collected and transmitted to an enterprise data center for processing.

The system may include an item information database containing detailed information regarding virtually every type of item which may be sold by any store in the enterprise. As used herein a database is a collection of related data. In one embodiment, the item information database may be maintained at the enterprise data center. At step 14, the system may retrieve case composition-information from the item information database for each type of case received at a store. Case composition information may include information regarding the number and types of items that may be produced using the contents of a particular type of case. Case composition information may also include a method or formula for calculating the cost of each item that may be produced from a case.

At step 16, the system may use the case composition information and the case cost to calculate a cost for each type of item which may be produced using the cases received by the store. The cost for each such item may be saved to a store cost file or database at step 18. The store cost file is a collection of item cost information for a particular store. The system may maintain a separate cost file for every store within the enterprise at the enterprise data center. In addition, the system may maintain a division cost file or database for each enterprise division including the item cost for every type of item received by any store within that division at the enterprise data center. The store cost file and division cost file may be implemented using an ordered sequential file or any other data storage method.

The system may also track every item sold by the store. At step 20, the system may collect information from point of sale registers to identify the types of items, the quantity of each type of item, and the total retail sales for each type of item sold by the store. This information may be collected at the stores and periodically transmitted to the enterprise data center for processing. At step 22, the system may retrieve item information from the item information database, including a text description of the item name, department, commodity and the like for each type of item sold by the store.

At step 24, the system may attempt to retrieve the item cost for each type of item from the store cost file. If the store cost file does not contain an item cost for a given item type, the system may attempt to retrieve the item cost from the division cost file at step 26. If the system is unable to retrieve an item cost for the store or division cost file, the system will use a default cost. The system may invoke specific, sequential "default costing" logic to derive the applicable cost at step 28.

At step 30, the system may identify and override the item cost for item types with either extremely low or extremely high margins. Margin, as used herein, is a percentage equal to the difference between the total retail sales of a type of item and total cost for the item type, divided by the retail sales. For example, for an item type with a cost of $1 and a retail price of $1.50, the margin is equal to 33.3%. The system may override the item cost and substitute a predetermined cost for an item type with a margin outside of an expected range.

At step 32, the system may generate multiple financial reports based upon the retail sales and costs of the various items. The system may provide summary reports as well as exception reporting. For example, the system has the ability to calculate and report the number of units sold, the total retail sales, the total cost and a margin percentage for every item sold by a store. Information from multiple stores may be combined to generate division-level reports or even enterprise-level reports. In addition, item information may be grouped by commodities to generate store, division or enterprise level commodity-specific reports.

Although not shown in FIG. 1, the system may also be used to generate cost for store inventory. Instead of associating an item cost for items sold by the store during a given period of time, the system may be used to generate costs for items present at the store at a given time. In this context, the system may be used to both value inventory and track shrink.

II. Generate or Update the Store and Division Cost Files

In one embodiment, the system tracks the number, type and cost of cases delivered to each store. Each case type may be assigned a unique case code such as a universal product code (UPC). Each type of item is also assigned a unique item code, such as a UPC. In one embodiment, an enterprise includes a system of warehouses, where vendors deliver cases to the warehouses and the cases are distributed from warehouses to the stores. The warehouse may include an automated warehouse tracking system, such as the System ID Complete Turnkey Inventory Solution with Falcon available from System ID Warehouse of Plano, Texas, which includes handheld scanners and software designed to track the distribution of cases. Scanners are devices for sensing and reading bar codes to identify items.

In an enterprise with a system of warehouses, a warehouse tracking system may record a cost for each case based upon vendor invoices. Typically, in retail markets, prices vary continually. Consequently, a warehouse may receive a first shipment of cases at one price and a second shipment of the same type of cases at a second, lower price. The warehouse tracking system may perform weighted averaging of the prices to determine the case cost to be charged to each store. For example, in a first shipment the warehouse may receive 100 cases of instant stuffing mix at a cost of fifty dollars for each case. At a later time, the warehouse may receive a discount and order an additional 50 cases of instant stuffing mix at a cost of forty dollars for each case. The weighted average cost charged to the stores can be calculated as follows:

$$(100*\$50.00+50*\$40.00)/150=\$46.67$$

In addition, certain cases may be shipped directly to the stores. For example, a store may receive cases of baked goods, fresh fish or other goods with a short shelf life directly from the vendor. Stores may also receive goods from directly from local, specialty vendors. In general, a store will receive an invoice indicating the case cost, case number and type of each case delivered to the store. Typically, this information is entered into the stores accounting system upon receive of the cases via electronic direct exchange. The information may be manually entered into a store's accounting system. In one embodiment, the information regarding the delivery of cases to a store, whether from a warehouse or directly from a vendor, is collected and processed periodically. For example, the system may collect case information on a weekly basis.

After collecting information regarding the types of cases delivered to a store within a given period of time, the system may retrieve case composition information for each type of case received. The system may include an item information database containing information regarding the number and type of each item that may be produced using the contents of each type of case. The system may use the case composition information and the cost per case to calculate a cost for each type of item capable of being produced using the contents of a case delivered to the store.

The system may include many different categories of cases. Each category may have a different method for calculating item cost for the types of items associated with the case type. In one embodiment, the system includes six categories of cases: fixed size single component, fixed size multiple component, variable sized single component, divisible, cut-down and built-up cases.

A. Fixed Size Single Component Cases

Fixed size single component cases contain a fixed number of a single type of item. For example, one case of Brand X instant stuffing mix contains 100 8 oz. boxes of Brand X instant stuffing. Each case of that case type will contain exactly 100 8 oz. boxes of that single type of item, an 8 oz. box of Brand X instant stuffing. Accordingly, the case composition information for this case type will include the item UPC for an 8 oz. box of Brand X instant stuffing and the number of items contained within the case (i.e. 100). To calculate the item cost for a single 8 oz. box of Brand X instant stuffing, the system simply divides the cost of the case by the number of items within the case. If the case cost is equal to $50.00 dollars, the cost per item will be equal to $50.00 divided by 100, or 0.50 dollars.

If the vendor of Brand X instant stuffing also sells the instant stuffing in a case of fifty 8 oz. boxes of Brand X instant stuffing, the fifty count case may be considered a separate case type. The fifty count case may be given a separate case UPC, which may be used to retrieve separate case composition information. The system may perform a separate calculation of item cost for boxes of instant stuffing based upon the fifty count case. The system may use a weighted average of the item cost from the one hundred count case and the fifty count case as described in further detail in the discussion of fixed size multiple component cases.

B. Fixed Size Multiple Component Cases

Fixed size multiple component cases include fixed numbers of multiple types of items. One example of a multiple component case is a module. A module, as used herein, is a case that converts into a self-contained, freestanding display unit. One type of module may include items associated with a holiday meal, such as Thanksgiving dinner. The Thanksgiving dinner module may contain twenty boxes of instant stuffing, ten jars of turkey gravy and 10 pie shells. Accordingly, case composition information for the Thanksgiving module case type may include the item UPCs for instant stuffing, turkey gravy and pie shell items as well as the number of each type of item contained in the case. The case composition information may also include information regarding the division of the case cost among the different types of items contained within the case. For example, instant stuffing items may constitute 20% of the case cost, gravy items may constitute 40% of the case cost and pie shell items may constitute the final 40% of the case cost. To calculate an item cost for a type of item, the system may multiply the total cost of the case by the cost percentage for that item type and divide by the number of items of that type of item contained in the case. In the Thanksgiving module example, if the case cost is sixty dollars and instant stuffing constitutes 20% of the case cost, the cost of twenty boxes of instant stuffing is equal 20% of $60.00, i.e. $12.00. Therefore, the cost of a single item of instant stuffing is equal to $12.00 divided by 20 boxes, i.e. $0.60.

As shown in the examples illustrating single component case types and multiple component case types, a single item type may have more than one associated item cost depending upon the case type in which it is shipped. A box of instant stuffing from the Thanksgiving module may have a cost of $0.60, while the box of instant stuffing from the case containing only instant stuffing may have an associated cost of $0.50. In one embodiment, the system calculates a weighted average of the different costs associated with the item type. In the examples discussed above the store has received 100 boxes at an item cost of $0.50 each and twenty boxes at an item cost of $0.60 each. To calculate the weighted average the system multiplies each item cost by the number of items received at that item cost. These costs are added together and divided by the total number of items received:

$$(100 \times \$0.50) + (20 \times \$0.60) = \$50.00 + \$12.00 = \$62.00 / 120 = \$0.52 \text{ per item}$$

C. Variably Sized Single Component Cases

Variably sized single component cases contain a single component that can be divided into a number of variably sized items of the same item type. For example, a block of cheese sold by the deli may be divided into multiple pieces of cheese of varying weights, each of which will have the same item UPC. For variably sized single component cases, retail price and item cost are based upon both size of the item and item type. For this category of case, the case composition information may include an average case size.

The system may also provide for the loss of a portion of the item during processing. For example, during slicing, a portion of the cheese may be lost to the culinary equivalent to sawdust. To determine a standard percentage of loss, multiple blocks of cheese may be weighed, sliced and reweighed to determine the average amount of cheese lost during slicing. In one embodiment, the case composition information includes a loss percentage.

To determine the cost per unit for a variably sized item, the system may subtract the predicted loss from the case size and divide the case cost by the remaining units. For example, if a block of cheese has a weight of 20 pounds, a cost of $30 and a predicted percentage loss of 1.5%, the predicted loss of cheese is equal to 1.5% of 20 pounds or 0.3 pounds of cheese. Accordingly, the store will expect to be able to sell 19.7 pounds of the cheese out of the 20-pound block. The cost for the cheese is equal to 30 dollars for 19.7 pounds, or $1.52 /lb. Although the example used herein describes items of variable weight, items may be measured and sold by other units. For example, fabric may be sold by the yard.

D. Divisible Cases

A divisible case contains multiple components that may be divided into groups to create several different types of items. A tray containing 120 balls of cookie dough is an example of a divisible case. Once the case is delivered to the store, the dough may be baked to produce cookies. The store may have the discretion to sell the cookies individually or in packages of 4, 12 or 20. Each package size may be considered a separate type of item. Therefore, the case is capable of producing multiple combinations of items and item types. For example, the store may choose to produce 20 individual cookies, 5 packages of 4 cookies, 5 packages of 12 cookies and one package of 20 cookies from the case, or any other combination of the 120 cookies.

In one embodiment, the case composition information includes the total number of components in the case and a unit factor equal to the number of components necessary to produce one item of each item type. For example, the individual cookie would have a unit factor equal to 1, the package of 4 cookies would have a unit factor of 4, the package of 12 cookies would have a unit factor of 12 and so on. To calculate the item cost for a type of item, the system divides the cost of the case by the number of components within the case to determine the unit cost. Then the unit cost is multiplied by the unit factor for the type of item. The system may calculate a cost for each type of item that is capable of being produced from that type of case. For example, for a cookie tray case with a cost of $20, the system will calculate a cost for individual cookies and packages of 4, 12 or 20 cookies. In this example, the unit cost is equal to $20 divided by 120 cookies or $0.17. Therefore, a single cookie would have a cost of $0.17, a package of 4 would have a cost of $0.67, a package of 12 would have a cost of $2 and a package of 20 would have a cost of $3.33.

E. Cut-down Cases

A cut-down case contains a single component that may be divided into a number of variably sized items of various item types. For example, a cut-down case may consist of a side of beef. A butcher at the store may cut the side of beef to produce a number of different types of cuts of meat (e.g. tenderloin, roast, sirloin, hamburger and the like). The cost of the case is based upon the weight of the side of beef. The items produced from a side of beef will vary in size from depending upon the size of the side of beef and the choices and cuts made by the butcher. The system calculates a cost per pound for each item type produced from the case.

Testing may be performed to predict the percentage yield of each type of item from the primal side of beef. In one embodiment, a number of sides of beefs may be cut by several different butchers. The results of these multiple cuts are analyzed to determine the average percentage of each type of item produced from the side of beef as well as the average percentage of loss during each cut-down. These percentages may be included in the case composition information along with an average weight for a side of beef.

To determine the cost per pound for each item type, the system may first subtract the expected loss from the average weight of a case to calculate the expected saleable pounds of meat. The total cost of the case may be divided by this expected saleable pounds to determine the cost per pound. All item types cut from a single side of beef will have the same cost per pound. As discussed above with respect to variably sized single component cases, although the example used herein describes items of variable weights, items may be measured and sold by other units.

F. Built-up Cases

Built-up cases contain components that may be combined with the contents of other case types to create items. For example, a store may sell deli sandwiches. A sandwich may include ⅛ lb. of roast beef, 1/32 lb. of Swiss cheese, a tablespoon of mustard and the like. Typically, the store will receive the ingredients of the sandwich in several different types of cases. For example, a case of mustard may contain two very large containers of mustard at a case cost of $10. The case composition information for the case of mustard may include the number of tablespoons of mustard within each container of mustard (e.g. 150). Therefore, the cost of each tablespoon of mustard is equal to the cost of the case divided by the number of tablespoons of mustard within the case. In this example, the cost of a tablespoon of mustard would be $10.00/(150*2), or $0.03. In one embodiment, the system may maintain recipe lists for each type of built-up item. The system may calculate and record the cost for each ingredient of every built-up item.

In another embodiment, the system may utilize default costs for certain types of items, such as built-up items. In certain instances, system operators may determine that it is not cost effective to track each item ingredient, and may elect to use default costs for certain item types, such as deli sandwiches.

Once the system has determined a cost for the item types that may be produced from the cases delivered to the store during the given period of time, these costs may be saved to a store cost file. In one embodiment, the store cost file contains the cost for the last four deliveries of an item. The system may purge item costs from the store cost file after a certain period of time, for example, two years, to prevent use of an out of date cost per item. In addition, the system may also maintain a division level cost file. The division level cost file is a cumulative record for all of the stores within a division. As used herein the store or division cost file may be implemented as a single file, a collection of files, a database or any other data storage option.

III. Associate an Item Cost with an Item

In one embodiment, once the store and division cost files have been updated, the system processes sales information, including each type of item sold, the number of each type of item sold and the total retail amount received for each type of item for each store within the enterprise.

Typically, each item has an item UPC contained in a bar code located on the item. In a one embodiment, bar code scanners located at the point of sale record the sale of each unit of every item type. One such scanner is the SurePOS™ scanner commercially available from International Business Machine Corporation (IBM) of Armonk, New York. A point of sale (POS) system record units of items sold. One possible POS system is the SurePOS™ Application Client/Server Environment (ACE), commercially available from IBM. The POS system at the store collects the information regarding the number of items sold for each item UPC and the total retail for the item UPC. In one embodiment, the sales information for a week may be collected at a store and transmitted to an enterprise data center at the end of each week. In another embodiment, the sales information may be transmitted to the enterprise data center on a daily basis.

In one embodiment, the system may maintain multiple item UPCs for each item, including a scanned UPC, a base UPC and a group UPC. As used herein, the scanned UPC is the UPC retrieved from the bar code located on an item. The base UPC is an additional item UPC utilized when the POS system is unable to obtain a UPC from the bar code for the item or when the information for a collection of item types is stored using a single UPC. The group UPC is used when the item type is a component of a second item type, and cost information is maintained under the second item UPC, as discussed in greater detail below.

While the system may simply use the scanned UPC for most items, not all items may be scanned at the point of sale. Certain items such as bags of ice may be too heavy to lift up to the scanner, other items, such as produce, may not have a bar code. In such situations, the cashier may enter a product look up code ("PLU") into the POS system using a keypad. This PLU may be used to retrieve the same information as a scanned UPC. The system will treat the PLU as the scanned UPC and generate a base UPC for the item.

In one embodiment, certain item types may be closely related. In such situations, it may be preferable to store the information for only one of the item types in the item information database. For example, a certain brand of paper towels may come in multiple patterns, such as checked, pink floral, green floral and the like. Each pattern will have a different scanned item UPC. However, for the purposes of the system the same information is associated with each scanned UPC. Therefore, the system may use a base UPC associated with each of the scanned UPCs. In one embodiment, sales information generated by the POS system will include a scanned UPC and an associated base UPC, if applicable.

In one embodiment, certain items may include a group UPC. A group UPC indicates that the item type is a component of another item type. For example, cigarettes may be sold by either the carton or the pack. To sell cigarettes by the pack store personnel simply open a carton of cigarettes. Both the pack and the carton have a bar code with a unique scanned UPC. The system may maintain an item cost for cartons of cigarettes, but not for individual packs. To calculate a cost for a pack of cigarettes, the system divides the cost of the carton by the number of packs contained in a carton. Therefore, a pack of cigarettes would have a scanned UPC read from the bar code located on the package and a group UPC equal to the scanned UPC for a carton of cigarettes.

Once the system has collected the sales information containing the scanned, base and group UPCs for each item type, the system retrieves additional information regarding each type of item from the item information database. This information may include a text description of the item, department and commodity information, the case UPC and the like.

After the system collects the sales information and retrieves item type information from the item information database, the system may associate an item cost with each type of item. In a first embodiment, the store and division cost files are implemented as databases and item cost for each item is retrieved using database queries. However, for a large retail enterprise selling a large variety of types of items this could require millions of database queries. In an alternate embodiment, the store cost file and division cost file may be implemented as ordered, sequential files. In an ordered, sequential file all of the records are organized serially, one after another, and may be organized or ordered using a key field, such as item UPC. To access records in a sequential file, the system must access the first record and read all the succeeding records until the required record is found or until the end of the file is reached. In one embodiment, the system will generate list of scanned, base and group UPCs and match those lists to the ordered, sequential store and division cost files to retrieve item cost.

Figure 2:
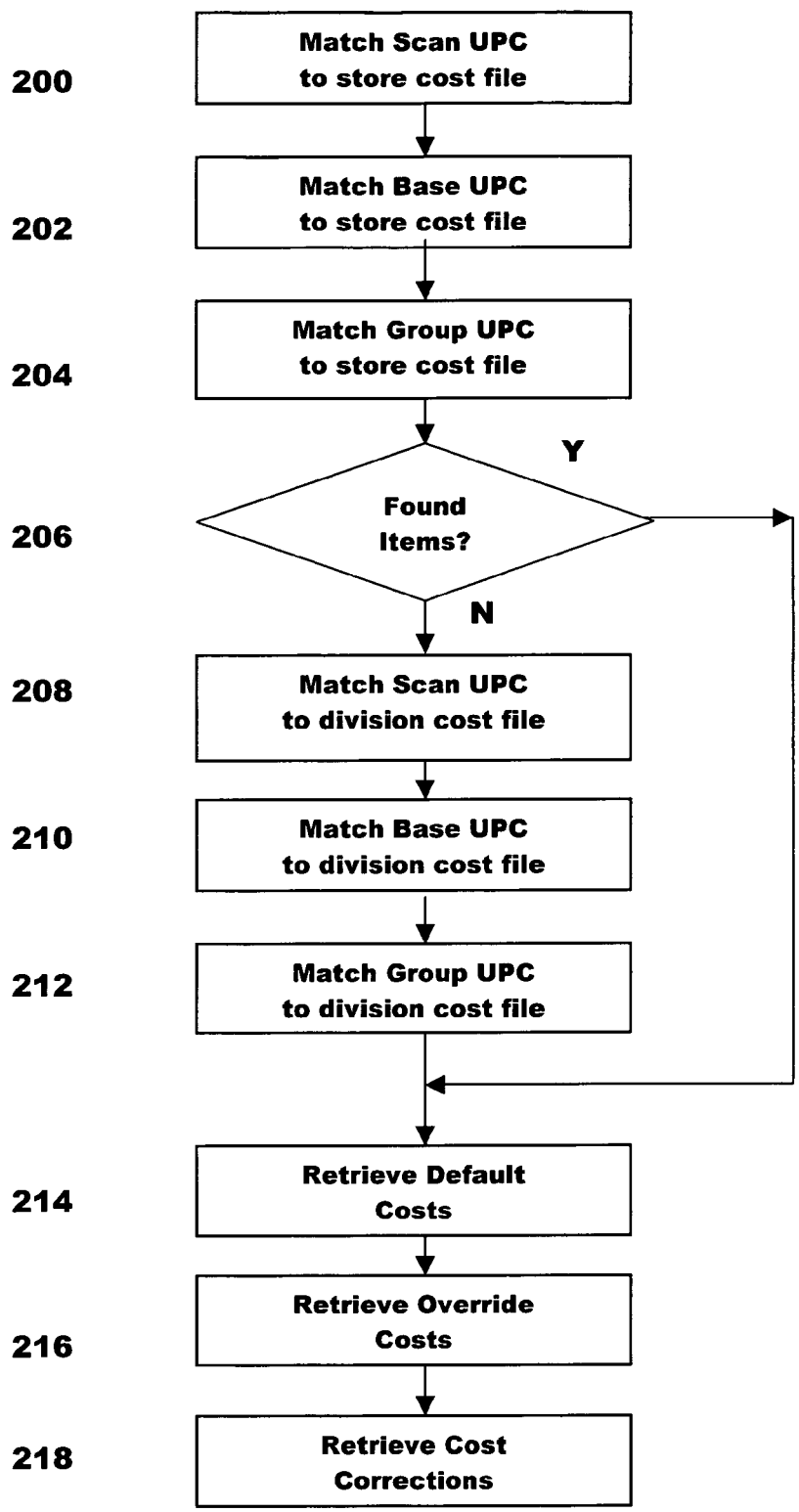
FIG. 2 is a flowchart illustrating a process for assigning a cost to an item type.

In the embodiment illustrated in FIG. 2, the system locates or generates an item cost for each type of item. At step 200, the system accesses the store cost file and attempts to match the scanned UPC of each of the types of items sold with an item UPC and item cost in the store cost file. At step 202, the system accesses the store cost file again and attempts to match the base UPC of each of the types items sold with an item UPC and item cost in the store cost file. Next, at step 204, the system accesses the store cost file a third time, attempting to match the group UPC of each type of item sold with an item UPC and item cost from the store cost file. If the system finds more than one match during the three passes through the store cost file, the system may use the item cost that has been updated most recently.

At step 206, the system determines whether it has located an item cost for each item type. If the system has been unable to locate an item cost for an item type within the store cost file, the system accesses the division cost file and attempts to match the scanned UPC for the unmatched item types at step 208. Next, at step 210, the system accesses the division cost file a second time and attempts to match the base UPC of the unmatched item with an item UPC and item cost from the division cost file. Finally, at step 212, the system accesses the division cost file a third time and attempts to match the group UPC of unmatched items with an item UPC and item cost from the division cost file. If the system finds more than one match during the three passes through the division cost file, the system may use the item cost that has been updated most recently.

After retrieving item costs from the store and division cost file, the sales information may still include certain types of items without an associated cost. For example, a deli sandwich prepared in the store may not have an item cost in the store or division cost file. The system may include a set of default costs to provide for such items. At step 214, the system may retrieve a default cost for any item type without an associated item cost.

Figure 3:
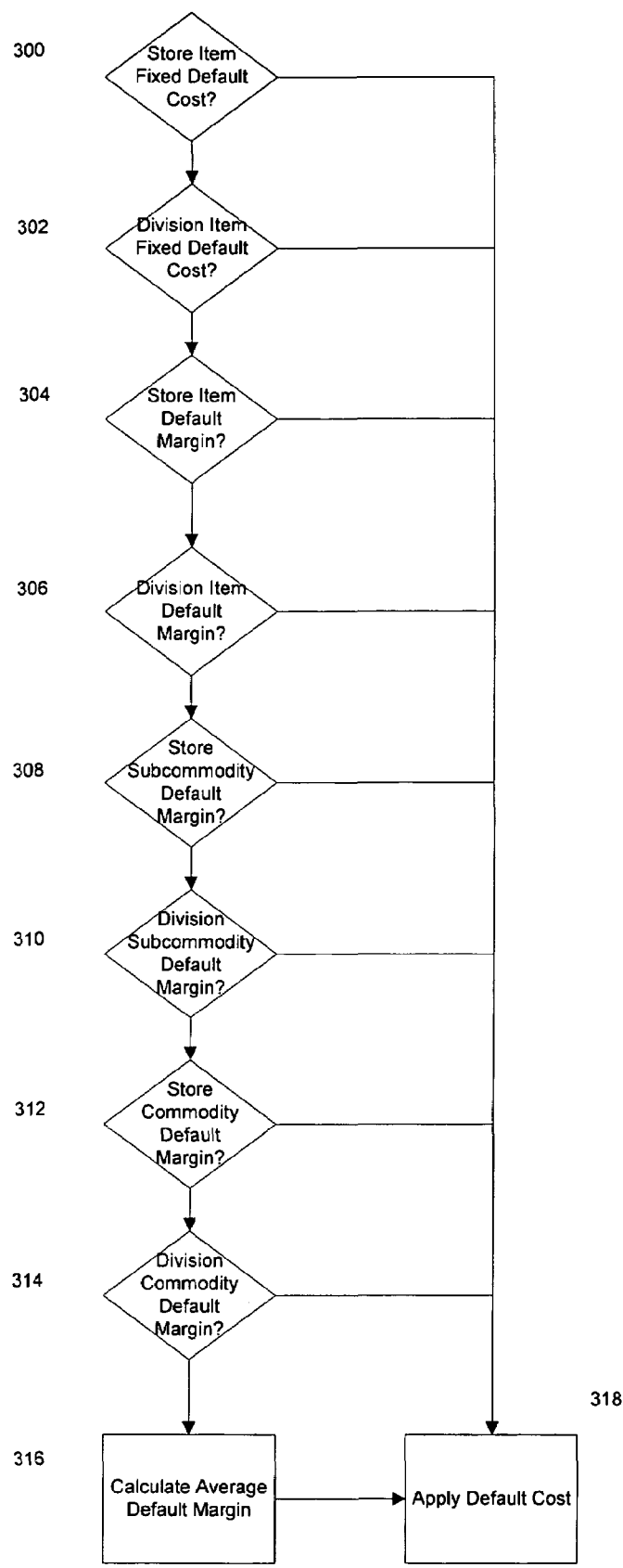
FIG. 3 is a flowchart illustrating a default costing process.

In one embodiment, the system includes a series of default cost rules used to determine item cost, as illustrated in FIG. 3. Each store and division may have a separate set of default costs for certain item types. At step 300, the system attempts to retrieve a store specific fixed default item cost for the scanned, base or group UPC of the item type from the default database. As used herein, a fixed default cost is a predetermined dollar amount. If the default database includes a store level fixed default cost for the item, the default cost is applied at step 318. If the system is unable to retrieve a store level fixed default cost, the system attempts to retrieve a division level fixed default cost for the scanned, base or group UPC for the item type at step 302. If the default database includes a division level fixed default cost for the item, the default cost is applied at step 318.

If the system is unable to retrieve a fixed default cost for the scanned, base or group UPC associated with the item type, the system will check the default database for a store level default margin for the item UPCs at step 304. As used herein, a default margin is a percentage of the retail price. For example, if the item has a retail price of $10.00 and the default margin is 55%, the item cost is equal to the retail price multiplied by one minus the default margin, i.e. $10.00*45% or $4.50. If the retail price of the item type is reduced to $8.00, the default cost will be equal to 45% of $8.00, i.e. $3.60. If a store level default margin is found, a cost will be calculated using default margin, otherwise the system will check for a division level default margin at step 306.

If the system is unable to retrieve a default margin for the item type at the store or division level, the system will attempt to retrieve a store level default margin for the subcommodity to which the item type belongs at step 308. If the system is unable to retrieve a store level default margin for the subcommodity, at step 310 the system will search the default database for a division level default margin for the subcommodity.

If the system is unable to locate a default margin for the subcommodity of the item type, the system will search the default database for a store level default margin for the commodity to which the item type belongs at step 312. If the system is unable to retrieve a store level default margin for the commodity, at step 314, the system will search the default database for a division level default margin for the commodity.

At step 316, if the system has been unable to retrieve a default cost or margin for the item type, the system may calculate a default cost based upon other item types within the same department. In one embodiment, the system calculates an average cost margin for all item types within the same department for which it was able to retrieve an item cost from the store or division cost files. This average is used as the default margin for the item type.

After default processing, every item type should have an associated item cost. At step 216 of FIG. 2, the system may provide a means to override the cost of one or more item types. Each division or store may establish override margin ranges that represent the current margin trends for each commodity or item type and identify item types with extremely high or low margins. For example, the override margin range for a 20 oz. bottle of soda may be from 90% to negative 200%. In this example, the system will determine whether that item type, a 20 oz. bottle of soda, yields an actual margin greater than 90% or less than negative 200%. If the margin is outside of the override margin range, the system will apply an override margin to calculate an override cost. The use of override costs prevents errors and leads to more realistic costing. For example, single 20 oz. bottles of soda frequently show a margin of more than negative 200% because the scanner at the point of sale may register the item UPC for a six-pack of 20 oz. bottles rather than an individual bottle. Consequently, the system retrieves the item cost for a six-pack of 20 oz. bottles. Properly set cost override margins may correct for this error and assign a more realistic margin of 10%. The system may base override margins upon average commodity margins. Although, in the preceding example margin was used to determine when to override the item cost, one skilled in the art will appreciate that other measurements might be used, such as item cost and the like.

In one embodiment, at step 218 the system provides a means for correcting an item cost. If the system operator becomes aware that there is an error in item cost, but the cost margin for the item type remains within the override margin range, the system operators may replace the item cost with a corrected item cost.

IV. Report Generation

The system may utilize the cost and sales information to generate a variety of reports allowing store, division and enterprise level management to monitor and manage costs associated with item, commodities, departments, stores and divisions and to maximize profits. In one embodiment, the system may generate an item detail report. The item detail report lists ever type of item sold by a store in a given period of time, such as a week, and includes item information such as the scanned UPC, the case UPC, a text description of the item type, the number of units sold, the total retail dollars, the total cost dollars, the gross margin percentage and the like. The system may also be used to produce a store commodity summary, which lists the total retail dollars, total cost and margin for each commodity and department by store.

The system may also produce exception-based reports. Exception based reports are triggered by events or values which fall outside of a normal range. For example, the system may generate a negative margin report listing all items sold by a store at a negative margin. This report may highlight potential problems, however, a store may choose to set a retail price below item cost for certain items for competitive reasons.

The system may generate additional reports such as slow-moving item, overridden cost, zero cost or high-low margin percentage reports. A slow-moving item report indicates those items sold by a store during the given time period where the item type has not been delivered to the store for a significant period of time, such as six months. An overridden cost report may list all instances where a cost override margin was applied. A zero cost report may include those item types that do not have an item cost in either the store cost file or the division cost file. A high-low margin percentage report may include item types with unusually high or low cost margins, where the margins did not exceed the thresholds required for the override cost margin. For example, the system may include a warning range for cost margins of 0% to 60%. If the cost margin for an item type is outside of this range, the item type may be listed on the high-low margin percentage report, but would not trigger a cost override by the system. One skilled in the art will appreciate that many different reports may be created using the financial data generated by the system.

V. Inventory

In one embodiment, the system may also be used during the store inventory process. During inventory, the system utilizes the same store and division cost files, however, instead matching item cost to the items sold during a specific time period, item cost is matched to items physically present at the store.

VI. System Architecture

Figure 4:
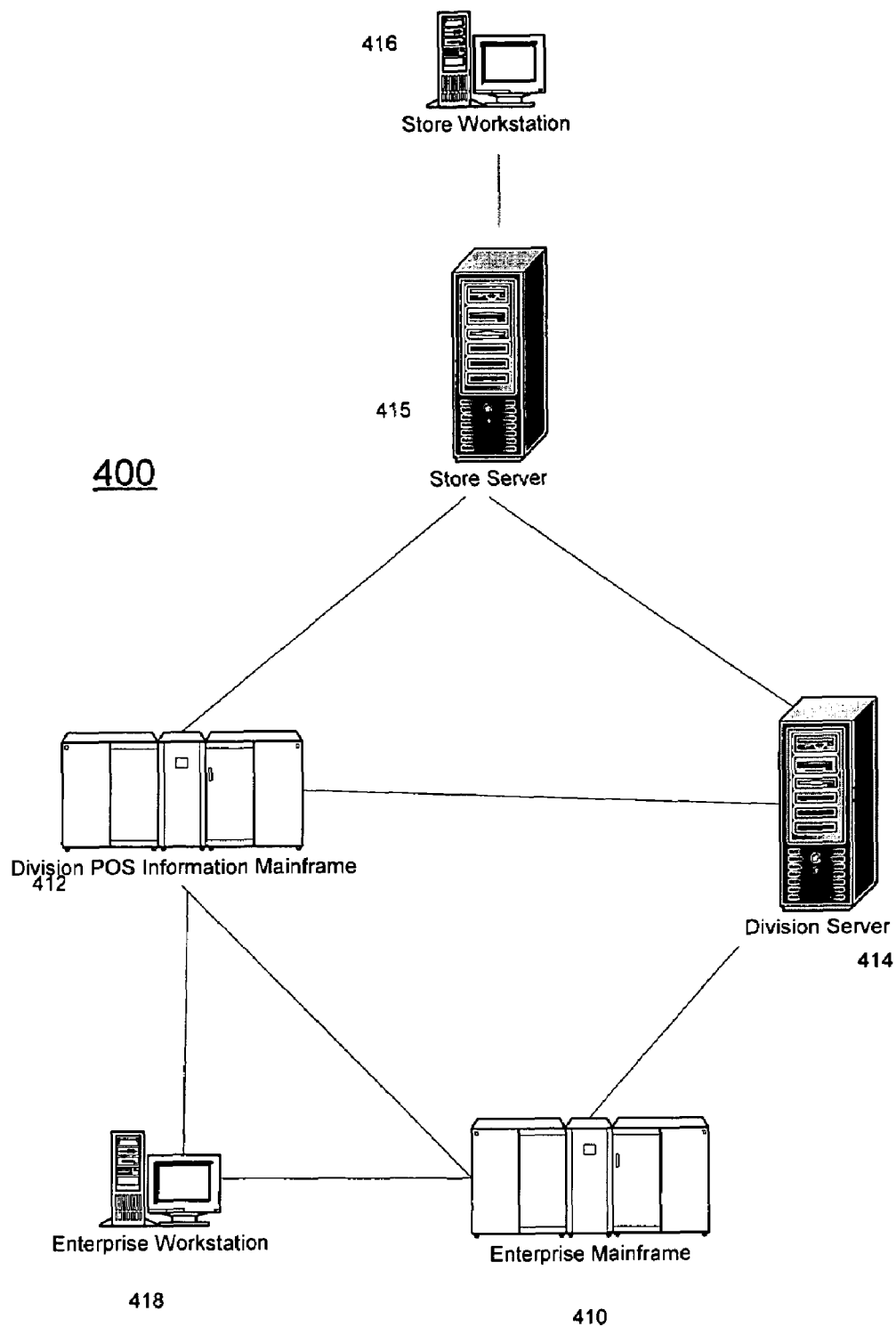
FIG. 4 is an illustration of an embodiment of the system architecture.

FIG. 4 illustrates one embodiment of a system architecture for the financial data management system 400. The lines depicted in FIG. 4 connecting the elements of the system 400 indicate communication paths rather than physical connections between the elements. The system may include an enterprise mainframe 410. Case delivery information, the item information database, the store cost file and the division cost file may be maintained on the central mainframe 410. The item information database may be implemented as a relational database, such as DB2 Universal Database V8.1 commercially available from IBM.

A division POS information mainframe 412 may be used to maintain the sales information received from POS systems maintained at the stores. The division POS information mainframe 412 may be partitioned, such that each division of the enterprise utilizes a separate portion of the division POS information mainframe 412. The enterprise mainframe 410 and division POS information mainframe 412 may be implemented using the eServer zSeries 900, commercially available from IBM.

The system 400 may include one or more division servers 414. Each division of the enterprise may have a separate division server 414 in communication with one or more store servers 415. The division server 414 and store server 415 may be implemented using an eServer series 570, available from IBM. Store servers may be connected to one or more store workstations 416 for the store.

The store workstation may be implemented using a personal computer having suitable input/output devices, such as a mouse or keyboard, processors, memory and communications interfaces. For example, the workstation 416 could be implemented using the ThinkCentre™ A30, commercially available from IBM. Workstation 416, as used herein, may also include digital assistants and other devices permitting connection to and navigation of the network.

The system 400 may include one or more enterprise workstations 418. System administrators may utilize the enterprise workstation 418 to maintain and update the central mainframe 410 and the division POS information mainframe 412. The central mainframe 410, division POS information mainframe 412, division server 414, store server 415, enterprise workstation 418 and store workstation 416 may be connected to a wide area network (WAN), such as an intranet, the Internet, an extranet or any other communications network. The system is sufficiently flexible in its design to permit implementation in various computer systems and networks and is not limited to the system architecture described above.

While particular embodiments of the present invention have been illustrated and described, it would be obvious to those skilled in the art that various additional changes and modifications can be made without departing from the spirit and scope of the present invention. While the items, commodities, departments and the like have been shown illustrative of a grocery store, certainly those of skill in the art can apply these principles to stores, factories, service industries and warehouses of various types. It is therefore intended to cover in the appended claims all such changes and modifications that are within the scope of this invention.

What is claimed:

1. A method for managing financial data, comprising the steps of:

(a) receiving a case at a store, where the case includes one or more components capable of being used to produce a variable number or type of items;

(b) receiving case code information identifying the nature of components in the case and case cost information;

(c) receiving case composition information for the received case, where the case composition information identifies one or more types of food items capable of being produced using the components of the case;

(d) calculating an item cost for each of the one or more types of food items capable of being produced using the components of the case, wherein the calculating uses the case composition information and the case cost information;

(e) storing the item cost in a store cost database and a division cost database;

(f) producing a food item using a food preparation operation by processing one or more components of the case;

(g) placing the food item on display for consumer purchase;

(h) identifying the food item by scanning a bar code associated with the food item, the food item being separate from the one or more components of the case and being identified separately from any of the one or more components;

(i) associating the item cost with the identified food item, the step of associating the item cost with the identified item comprising looking first in the store cost database for the item cost calculated in step (d) and if the item cost calculated in step (d) is not in the store cost database then looking in the division cost database for the item cost calculated in step (d), the division cost database being associated with a number of stores, while the store cost database being associated with only the store; and (j) generating financial data using the item cost for the identified food item.

2. The method of claim 1, wherein the store cost database is an ordered, sequential file.

3. The method of claim 1, wherein the divisional cost database is an ordered, sequential file.

4. The method of claim 1, wherein the case composition information is received from an item information database.

5. The method of claim 1, further including the step of receiving item information for the identified food item, where the item information includes text description of the identified item.

6. The method of claim 1, wherein the store inventory includes the identified food item.

7. The method of claim 1, wherein the identified food item is sold by the store, the food item being located on display, separate from the one or more components, for customer purchase when being identified.

8. The method of claim 1, wherein one of the components is capable of being divided to produce a plurality of variably-sized items of a plurality of types of items.

9. The method of claim 1, wherein the components are capable of being divided into one or more groups of components to produce one or more items of a plurality of types of items.

10. The method of claim 1, wherein one of the components is capable of being divided to produce a plurality of variably-sized items of a single type of item.

11. The method of claim 1, wherein the components are capable of being combined with components of an additional case to produce one or more items.

12. The method of claim 1, wherein the case code information is a universal product code.

13. The method of claim 1, wherein the bar code is a universal product code.

14. The method of claim 1, further including the steps of receiving a default cost for the identified food item and determining the item cost associated with the identified food item based upon the default cost.

15. The method of claim 14, wherein the default cost is a percentage of a retail price for the item.

16. The method of claim 14, wherein the default cost is a fixed amount.

17. The method of claim 1, further including the step of receiving retail sales information for the identified food item.

18. The method of claim 17, wherein the step of generating financial data includes calculating a margin for the identified food item, wherein the calculating uses the item cost and the retail sales information.

19. The method of claim 18, further including the step of comparing the margin to a predetermined range of values.

20. The method of claim 19, further including the step of replacing the item cost with an override item cost, if the margin is outside of the predetermined range of values.

21. The method of claim 1, further including the step of replacing the item cost with a corrected item cost, where the corrected item cost is determined by an operator.

22. A method for managing financial data, comprising the steps of:

(a) receiving a case at a store, where the case is a module and includes multiple component types, each component type including a variable number or type of items;

(b) receiving case code information identifying the component types in the case and case cost information;

(c) retrieving case composition information for the received case from an item information database using the case code information, where the case composition information identifies one or more types of items capable of being produced using the component types of the case, the case composition information including information regarding division of case cost among the different component types contained within the case;

(d) calculating an item cost for each of the one or more types of items capable of being produced using the component types, wherein the calculating uses the case composition information including division of case cost information and the case cost information, (e) storing the item cost in a cost database;

(f) identifying an item produced in a food preparation operation using one or more component types of one or more cases received at the store by entering a code associated with the item;

(g) retrieving item information for the identified item from the item information database, where item information includes a text description of the identified item;

(h) retrieving an item cost for the identified item, wherein retrieving item cost comprises receiving a default cost for the identified item and determining the item cost associated with the identified item based upon the default cost, wherein the default cost is a percentage of a retail price for the item;

(i) associating the item cost determined in step (h) with the identified item; and (j) generating financial data using the item cost associated with the identified item in step (i).

23. A system for managing financial data, comprising:
an enterprise mainframe including an item information database, store cost database and
a division cost database;
a sales information mainframe; and one or more store workstations;
wherein the enterprise mainframe is programmed to perform the steps of:
- receiving case code information for a case received at a store, where the case includes one or more components capable of being used to produce a variable number or type of items, and where the case code information identifies the nature of components in the case and case cost information;
- retrieving case composition information for the received case from the item information database, where the case composition information identifies one or more types of food items capable of being produced using the components of the case;
- calculating an item cost for each of the one or more types of food items capable of being produced using the components of the case, wherein the calculating uses the case composition information and the case cost information,
- storing the item cost in the store cost database and the division cost database;
- associating an electronically identifiable code with a food item produced using the components so that the food item can be identified electronically;
- receiving sales information for the food item produced using one or more components of the case during a food preparation operation from the sales information mainframe;
- associating the item cost with the food item, the step of associating the item cost with the food item comprising looking first in a store cost database for the item cost calculated and if the food item cost calculated is not in the store cost database then looking in the division cost database for the food item cost calculated, the division cost database being associated with a number of stores, while the store cost database being associated with only the store;
- generating financial data using the item cost for the food item; and
- transmitting the financial data to the one or more workstations.

24. A method for managing financial data, comprising the steps of:
- receiving a case at a store, where the case includes food products capable of being used to produce a variable number or type of food items;
- receiving case code information identifying the nature of the food products in the case and case cost information;
- receiving case composition information for the received case, where the case composition information identifies one or more types of food items capable of being produced using the food products of the case;
- identifying a predicted percentage loss for the food products to account for a predicted loss of a portion of the food products during a food preparation process;
- calculating an item cost for the one or more types of food items capable of being produced using the food products of the case, wherein the calculating uses the case composition information, the case cost information, and the predicted percentage loss,
- storing the item cost in a store cost database that is an ordered, sequential file;
- producing a first food item using one or more food products of the case, wherein producing the first food item includes using the food preparation process;
- producing a second food item using a second food preparation process;
- identifying the first food item by entering a first code associated with the first food item where the first code associated with the first food item is different from the case composition information, the first food item being on display for consumer purchase;
- identifying the second food item by entering a second code associated with the second food item;
- associating the item cost with the identified first food item, wherein the item cost of the first food item is in a store cost database associated with only the store;
- associating the item cost with the identified second food item, wherein the item cost of the second food item is in a division cost database associated with multiple stores; and
- generating financial data using the item cost for the identified first and second food items.

25. A method for managing financial data, comprising the steps of:
(a) receiving a case at a store, where the case includes one or more components capable of being used to produce a variable number or type of items;
(b) receiving case code information identifying the nature of components in the case and case cost information;
(c) receiving case composition information for the received case, where the case composition information identifies one or more types of food items capable of being produced using the components of the case;
(d) calculating an item cost for each of the one or more types of food items capable of being produced using the components of the case, wherein the calculating uses the case composition information and the case cost information;
(e) transmitting the item cost to a data center via a communications network;
(f) storing the item cost in a store cost database and a division cost database at the data center;
(g) producing a food item using a food preparation operation by processing one or more components of the case;
(h) obtaining sales information associated with the food item using a point of sale system to scan a bar code associated with the food item;
(i) transmitting the sales information associated with the food item to the data center via the communications network;
(j) associating the item cost with the sales information, the step of associating the item cost with the sales information comprising looking first in the store cost database for the item cost calculated in step (d) and if the item cost calculated in step (d) is not in the store cost database then looking in the division cost database for the item cost calculated in step (d), the division cost database being associated with a number of stores, while the store cost database being associated with only the store;
(k) associating a default item cost with the sales information, if the step (j) of associating the item cost with the sales information item fails, the step (k) of associating the default item cost with the sales information comprising looking first for a store default item cost and if the store default item cost is not available then looking for a division default item cost associated with a number of stores, while the store default item cost is associated with only the store; and
(l) generating financial data using at least one of the item cost and the default item cost associated with the sales information.

* * * * *